Aug. 30, 1949.    T. R. GARDINER    2,480,188
STOP DEVICE FOR ANCHOR SHANKS
Filed Nov. 4, 1946    2 Sheets-Sheet 1
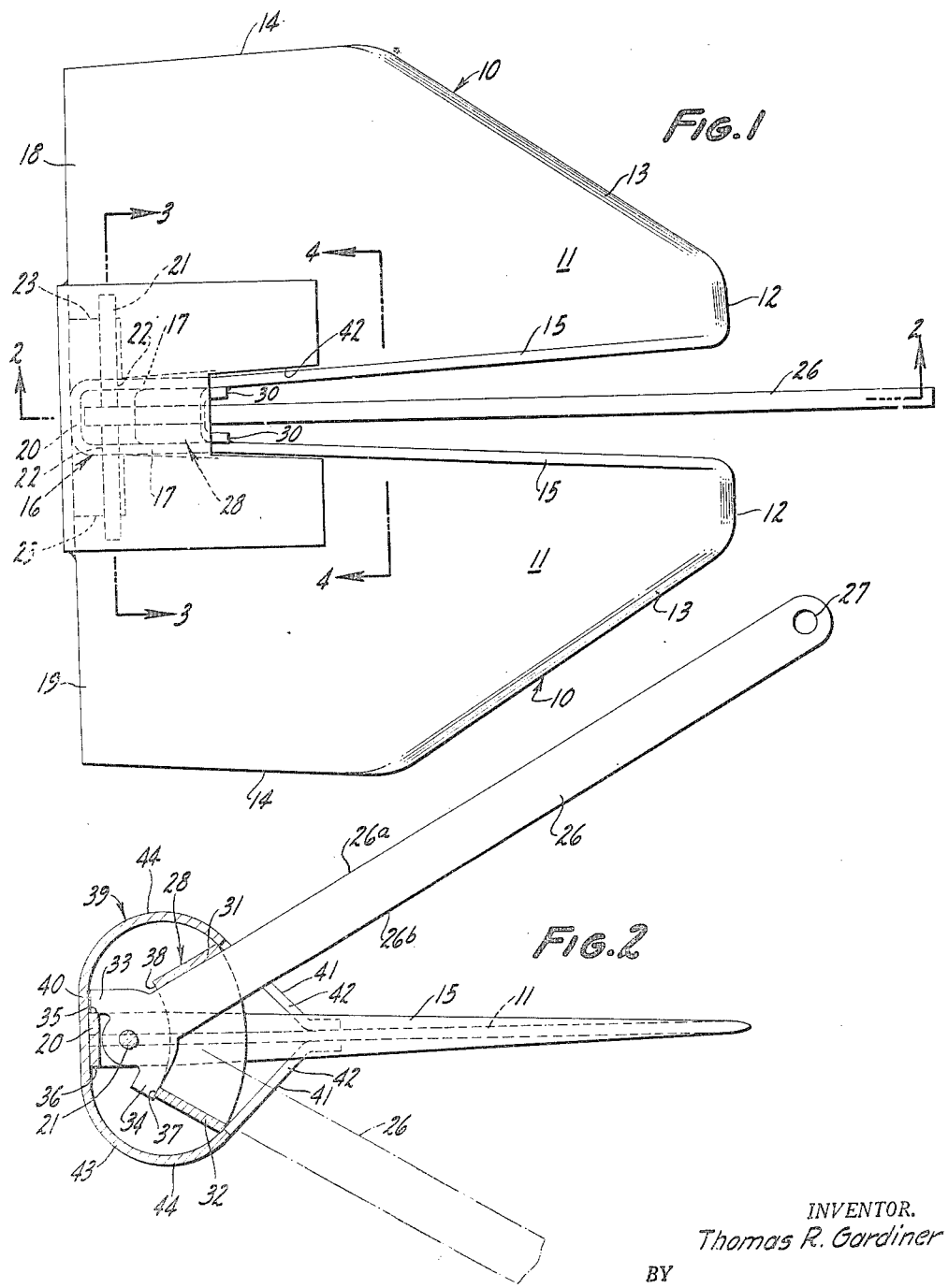

Aug. 30, 1949.    T. R. GARDINER    2,480,188
STOP DEVICE FOR ANCHOR SHANKS
Filed Nov. 4, 1946    2 Sheets-Sheet 2

INVENTOR.
Thomas R. Gardiner
BY
Mellin & Hanscom
ATTORNEYS

Patented Aug. 30, 1949

2,480,188

UNITED STATES PATENT OFFICE 2,480,188

STOP DEVICE FOR ANCHOR SHANKS

Thomas R. Gardiner, Piedmont, Calif.

Application November 4, 1946, Serial No. 707,557

8 Claims. (Cl. 114—208)

The present invention relates to anchors, and more particularly to anchors of the twin fluke type.

It is an object of the present invention to provide a stop device for the shank of an anchor capable of withstanding and transmitting greater loads between the shank and the anchor flukes.

A further object of the invention is to provide a stop device for the shank of an anchor which relieves the shank pivot mounting of a substantial portion of the load transmitted between the shank and the anchor flukes.

Another object of the invention is to provide an improved stop for an anchor shank, which is simple and compact, lending itself to ready assembly as a component part of the anchor.

Yet another object of the invention is to provide a stop for an anchor shank, capable of transmitting the forces resisting movement of the anchor directly from the flukes to the shank.

Several forms which the invention may assume are exemplified in the following description and illustrated by way of example in the accompanying drawings, in which:

Fig. 1 is a top plan view of one form of twin fluke anchor embodying the invention.

Fig. 2 is a longitudinal section taken along the line 2—2 of Fig. 1.

Figure 3:
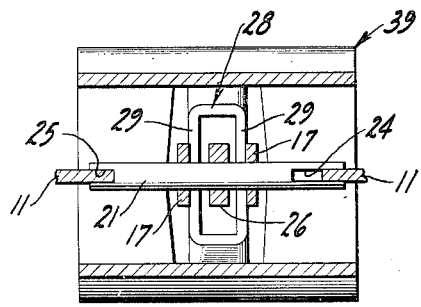
Fig. 3 is a partial cross-section taken along the line 3—3 of Fig. 1.
Figure 4:
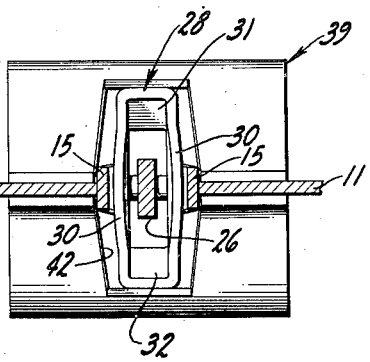
Fig. 4 is a cross-section taken along the line 4—4 of Fig. 1.

As disclosed in the drawings, a pair of flukes 10, 10 are provided, whose blades 11 lie in a common plane and have rounded forward ends 12 and sharpened edges 13 diverging in a rearward direction toward the outer side edges 14 of the blades. Flanges 15, integral with the blades 11, project in opposite directions from their top and bottom faces. The rearward portions of these flanges are interconnected with one another by a U-shaped member 16, whose arms 17 extend between the rear blade tabs 18, 19, and whose base 20 holds the arms in spaced relation. It is preferred that the blades 11 be integral with the flanges 15, and that the arms 17 actually constitute part of the flanges by being formed integrally therewith and with each other through the medium of the base 20.

The arms 17 of the U-shaped rearward flange portion 16 are generally parallel to one another, and the flanges 15 themselves diverge slightly in a forward direction, beginning from the rear points of attachment 20 or integration of the flanges with the blades themselves. The divergent flange portions 15 are bevelled, tapering toward the blade faces in a forward direction, with their front ends merging into the blades in the region of the rounded ends or corners 12.

A pivot pin 21 extends through aligned holes 22 in the parallel flange arms 17, the ends of the pin being slotted to fit snugly over the rear tabs 18, 19 on the blades. It is to be noted that the inner edges 23 of the tabs are spaced from the arms 17 to permit placing of the holes in the plane of the blades 11. One slot 24 of the pivot pin is substantially longer than the other slot 25, to permit its assembly in the manner to be described hereinafter. The pin 21 is suitably secured, as by welding, to the blade tabs 18, 19.

A shank 26 is oscillatably mounted on the pivot pin 21 and has a hole 27, or some other suitable means, at its forward end for attachment of a cable (not shown). This shank is swingable in a plane at right angles to the plane of the blades 11 between predetermined limits. A multiple contact stop arrangement is provided for limiting the extent of swinging movement of the shank with respect to the flukes 10 of the anchor. As disclosed in Figs. 1 to 4, inclusive, this stop device is provided by a forged one-piece oblong member 28, positioned between the fluke arms 17, the sides 29 engaging the arms and the forward portions 30 of the sides being bent outwardly slightly, in order to diverge at substantially the same angle as the flanges 15. The main portion of the sides 29 of the one-piece stop are straight and parallel, and the top and bottom portions 31, 32 of the stop are also straight, inclining rearwardly toward the plane of the fluke blades 11.

The top 31 and bottom 32 of the stop diverge with respect to one another in a forward direction, their angle of inclination to the plane of the flukes 10 determining the maximum angle of inclination of the shank 26 with respect to the flukes upon its swinging on its pivot pin 21. The stop 28 is suitably secured, as by welding material, to the side flanges 15.

It has been pointed out above that one of the pin slots 24 is substantially longer than the other pin slot 25 to facilitate assembly of the device. When such assembly takes place, one of the rear tabs 18 of the fluke blades is bent from its normal plane to permit insertion of the pin 21 through the hole 22 in one arm 17 of the flange, through the shank 26, and through the other arm 17 of the flange, placing the long slot 24 over the opposing tab 19 on the other fluke leg. The extended length of this slot 19 permits the pin to be moved inwardly until the other short slotted end of the pin is free from the plane of movement of the inner edge 23 of the tab 18. The tab may then be bent back to its initial position, coincident with the plane of the fluke blade, whereupon the pin 21 may be slid back to position the short slot 25 over the repositioned tab 18. Thereafter, the pin may be secured, as by welding, to both tabs, offering support for the tabs and also insuring the appropriate spacing of the fluke blades 11. The pin 21 assists in resisting any tendency for the flukes 10 to alter the angle of divergence between the flanges 15.

The rearward portion of the shank 26 is provided with upper and lower lugs 33, 34 adapted to engage the upper and lower edges 35, 36, respectively, of the base portion 20 of the U-shaped member, which, as described above, is integral with the fluke flanges 15. The shank pivot pin 21, the forward one-piece stop 28, and the base portion 20 of the U-shaped member are so disposed with respect to one another and with respect to the shank lugs 33, 34, as to provide a simultaneous triple contact between the shank 26 and the forward stop 28 and rearward flange base 20. As is evident from Fig. 2, the swinging of the shank upwardly to its maximum position relative to the flukes causes the upper surface 26a of the shank to engage the upper divergent side 31 of the forward stop along its entire length, providing a long-bearing surface contact between the two members. At the same time, the top lug 33 is in engagement with the upper edge 35 of the flange base, and the lower lug 34 is in engagement with the rear edge 37 of the lower side 32 of the one-piece oblong stop member 28. Similarly, swinging of the shank in the opposite direction to its maximum extent with respect to the flukes brings the bottom side 26b of the shank into full-bearing contact with the bottom 32 of the integral stop, the upper lug 33 into contact with the rear edge 38 of the top stop 31, and the bottom shank lug 34 into engagement with the lower edge 36 of the flange base 20. It is apparent that a triple contact is provided between the shank and the stop device, having a large bearing contact and load transmitting capacity.

If desired, the forward stop 28 may be used alone through omitting the lugs 33, 34 on the shank; or the lugs may be provided alone and the forward stop omitted to produce the desired stop effect between the shank 26 and flukes 10. It is preferred, however, to provide the multiple stop arrangement, since it not only provides a relatively great area of contact through which the load may be transmitted between the shank and flukes, but it also relieves the pivot pin 21 of a substantial portion of the load being transmitted. It is evident that the contact between either the top 31 or bottom 32 of the forward stop with the shank 26 and the simultaneous contact between the lugs 33, 34 and either the upper or lower edge 35, 36 of the flange base 20 and the rear edge of either the top or bottom stop portion removes a large portion of the load from the pivot pin.

A crown 39, preferably of one piece, is bent to fit over the top and bottom faces of the fluke blades 11, with its back portion 40 suitably secured, as by welding, to the tabs 18, 19. The crown extends over the flukes 10 in a forward direction, and has its forward convergent sides 41 suitably secured to the fluke blades 11, as by welding. These forward sides are cut out to provide a space 42 through which the shank 26 may swing and into which the flanges 15 project.

The rear portion 43 of the crown also converges toward its back 40, merging with the forward sides 41 at a point in advance of the pivot pin 21. When resting upon the bottom or ground, this point of merger 44 provides a pivot or rocker, allowing the flukes 10 to tilt in a forward direction and be inclined initially to the ground at a suitable angle to insure penetration of the fluke blades 11 into the ground upon the taking of a forward pull on the shank. Such pull increases the angle of inclination of the flukes and causes their penetration into the ground for burial to the fullest extent. The maximum angle assumed by the shank 26 with respect to the plane of the fluke blades 11 is determined by engagement of the shank and its lugs with the stops.

Figure 5:
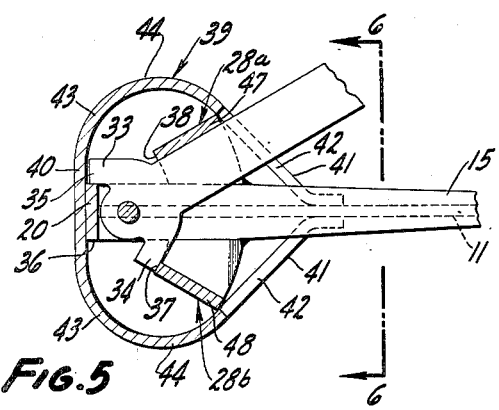
Fig. 5 is a partial longitudinal section through another embodiment of the invention.
Figure 6:
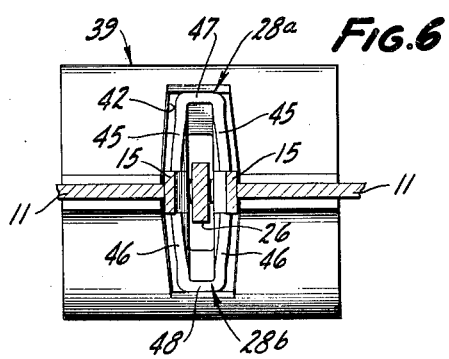
Fig. 6 is a cross-section taken along the line 6—6 of Fig. 5.

A modified form of the invention is disclosed in Figs. 5 and 6. Instead of the forward stop being made of one piece, it can be made of a plurality of pieces. Specifically, the upper portion 28a is generally channel-shaped, with its sides 45 parallel to one another and welded to the upper flanges or arms 17 of the anchor device. Similarly, the lower stop 28b is generally U-shaped, with its legs 46 engaging the lower flanges or arm 17 and suitably welded thereto. The upper stop 28a has its top side 47 inclined rearwardly toward the plane of the flukes 10. Similarly, the bottom side 48 of the lower stop 28b is inclined rearwardly toward the plane of the flukes.

When welded to the flanges 15 or arms 17, the upper and lower stops 28a, 28b occupy identically the same position as the one-piece stop 28 disclosed in the other modification, being so positioned as to provide a surface contact with the top 26a and bottom 26b of the shank. The lugs 33, 34 and the major portion of the shank itself engage cooperable stop members 26a, 26b, 20 simultaneously.

Figure 7:
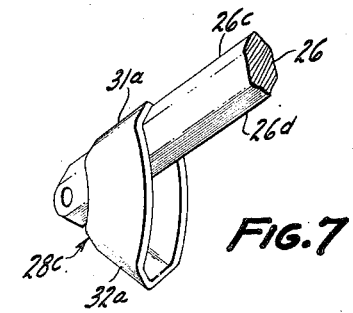
Fig. 7 is an isometric projection of a modified form of shank and cooperable stop.

A modified form of stop and cooperable shank is disclosed in Fig. 7; wherein the inclined top 31a and bottom 32a of the stop 28a are pitched and converge toward each other in an outward direction to cooperate with companion convergent top and bottom surfaces 26c, 26d on the shank. The engagement between the shank 26 and stop 28a is still along an extended surface, as in the other forms of the invention, the outward convergence of the tops 31a, 26c and bottoms 32a, 26d serving to center the shank in the stop and also increasing the area of contact therebetween.

It is, therefore, apparent that a comparatively compact and simple stop device has been provided for the anchor shank, capable of ready assembly as a component part of the anchor. The fact that the multiple stop is provided, especially one in which the contact surfaces between the shank and stop members are relatively large, insures the ability of the stops to transmit greater loads than heretofore possible without fear of damage to the anchor, and especially to its pivot pin, which is relieved of a substantial portion of the load. Moreover, the integrating of the stops to the fluke flanges provides for the direct transmission of the forces between the flukes and shank.

Certain features of invention herein disclosed, relating to the functionally integral structure of the anchor and to the pivot pin arrangement, are claimed in my application for "Anchor", Serial No. 707,556, filed November 4, 1946.

While I have shown the preferred forms of my invention, it is to be understood that various changes may be made in their construction by those skilled in the art without departing from the spirit of the invention as defined in the appended claims.

Having thus described my invention, what I claim and desire to secure by Letters Patent is:

1. An anchor comprising a pair of flukes lying generally in a common plane, means providing upper and lower stops extending between and secured to said flukes, each stop including a transverse member inclined rearwardly toward the plane of said flukes, a shank engageable with said stops and mounted for pivotal movement between said flukes about an axis to the rear of said stops and a crown secured to said flukes and disposed over said stops.

2. An anchor comprising a pair of flukes lying generally in a common plane, a unitary ovate shaped stop member positioned between and secured to said flukes, said member having top and bottom portions inclined rearwardly toward the plane of said flukes, a shank engageable with said top and bottom portions, said shank being mounted for pivotal movement between said flukes and within said stop member about an axis to the rear of said stop member and a crown secured to said flukes and disposed over said stop member.

3. An anchor comprising a pair of fluke blades lying generally in a common plane, upper and lower flanges on the inner edges of said blades projecting at right angles from both the top and bottom faces of said blades, means providing upper and lower stops extending between and secured to said flanges, each stop including a transverse member inclined rearwardly toward the plane of said blades, a shank engageable with said stops and mounted for pivotal movement between said flanges about an axis to the rear of said stops and a crown secured to said flukes and disposed over said stops.

4. An anchor comprising a pair of fluke blades lying generally in a common plane, upper and lower flanges on the inner edges of said blades projecting at right angles from both the top and bottom faces of said blades, a unitary ovate shaped stop member positioned between said blades, said member having sides secured to said flanges and also having top and bottom portions inclined rearwardly toward the plane of said blades, a shank engageable with said top and bottom stop portions, said shank extending between said flanges and through said stop member, means mounting said shank for pivotal movement about an axis to the rear of said stop member, and a crown secured to said flukes and disposed over said stop member.

5. An anchor comprising a pair of flukes lying generally in a common plane, means providing upper and lower stops secured to said flukes, a shank mounted for pivotal movement between said flukes, and means on said shank engageable with one of said stops simultaneously with engagement by said shank with the other of said stops.

6. An anchor comprising a pair of flukes lying generally in a common plane, means providing upper and lower stops extending between and secured to said flukes, a shank mounted for pivotal movement between said flukes, and means on said shank engageable with a rear edge of one of said stops simultaneously with engagement by said shank with an inner portion of the other of said stops.

7. An anchor comprising a pair of flukes lying generally in a common plane, a transverse member extending between and secured to said flukes, a shank mounted for pivotal movement between said flukes, means providing upper and lower stops secured to said flukes, and means on said shank for simultaneously engaging said transverse member and both of said stops, in order to determine the maximum angle of inclination of said shank to the plane of said flukes.

8. An anchor comprising a pair of flukes lying generally in a common plane, a transverse member extending between and secured to said flukes, a shank mounted for pivotal movement between said flukes about an axis forward of said member, means providing upper and lower stops secured to said flukes, and upper and lower means on said shank engageable with the top edge of said transverse member and the rear edge of said lower stop simultaneously with engagement by said shank with an inner portion of said upper stop.

THOMAS R. GARDINER.

REFERENCES CITED

The following references are of record in the file of this patent:

UNITED STATES PATENTS

| Number | Name | Date |
| --- | --- | --- |
| 520,177 | Clark | May 22, 1894 |
| 1,373,741 | Jones | Apr. 5, 1921 |
| 2,249,546 | Denforth | July 15, 1941 |

OTHER REFERENCES

Anchor For Small Boat, Popular Science, published August 1937, page 100.

Disclaimer 2,480,188.—*Thomas R. Gardiner*, Piedmont, Calif. STOP DEVICE FOR ANCHOR SHANKS. Patent dated Aug. 30, 1949. Disclaimer filed July 6, 1950, by the inventor.
  Hereby enters this disclaimer to claims 1 to 4, inclusive, of said specification.
  [*Official Gazette August 8, 1950.*]